(No Model.)
P. GENDRON.
CANOPY HOLDER FOR CHILDREN'S CARRIAGES.
No. 377,608. Patented Feb. 7, 1888.
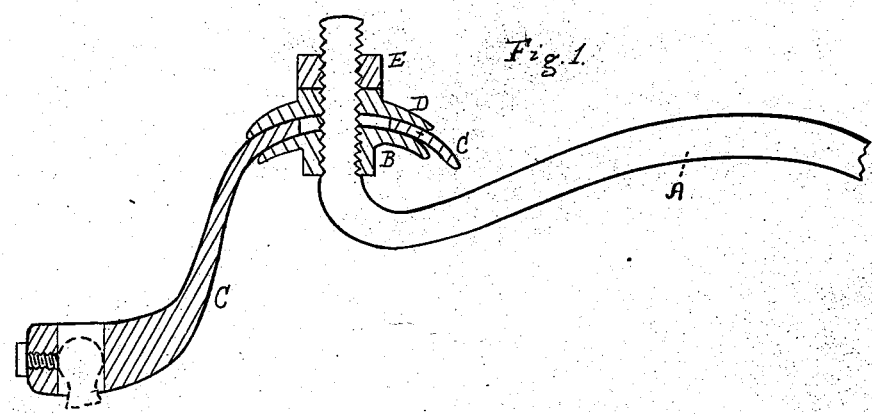
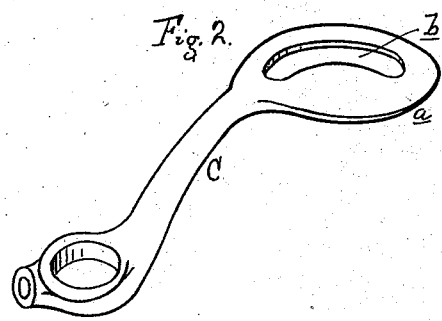
Attest:
A. S. Sprague
P. M. Hulbert
Inventor.
Peter Gendron.
By J. W. Robertson
Att'y.

UNITED STATES PATENT OFFICE.

PETER GENDRON, OF TOLEDO, OHIO.

CANOPY-HOLDER FOR CHILDREN'S CARRIAGES.

SPECIFICATION forming part of Letters Patent No. 377,608, dated February 7, 1888.

Application filed October 18, 1887. Serial No. 252,657. (No model.)

*To all whom it may concern:*

Be it known that I, PETER GENDRON, of Toledo, in the county of Lucas and State of Ohio, have invented new and useful Improvements in Canopy-Holders for Children's Carriages; and I do hereby declare that the following is a full, clear, and exact description thereof, reference being had to the accompanying drawings, which form a part of this specification.

This invention relates to certain new and useful improvements in canopy-top holders for children's carriages.

The object of the invention is to provide a means for adjustably supporting the canopy or parasol of a child's carriage in such a manner that said parasol or canopy may readily be adjusted at any desired angle for protecting the face of the child.

The invention consists in the peculiar construction and arrangement of the parts, all as more fully hereinafter set forth.

Figure 1 is a sectional elevation of my improved device. Fig. 2 is a perspective view of the adjusting-arm detached.

In the accompanying drawings, which form a part of this specification, A represents the main supporting-rod, which preferably is secured adjustably at the back of the carriage-body, its upper end being curved to the front and extending over the seat, where it turns upward and is threaded, as shown.

B is a circular nut threaded upon the end of the rod A, the upper face of such nut being convex in all directions.

C is the adjustable arm, one end of which terminates in a circular head, a, concave upon its lower face, to fit the convex face of the nut B, and convex upon its upper face. In this head is formed a slot, b, in the longitudinal direction of the arm, and is designed to slip over the end of the rod A, upon which is then placed the circular concave washer D, held in place by a retaining-nut, E, and by means of which the head of the arm C may be clamped between the washer and convex nut. The free end of the arm C is provided with any suitable means for securing a parasol or canopy therein.

By this construction and arrangement of parts the parasol or canopy can readily be adjusted, to the front, rear, axially, or laterally, into any position that will be the better protection to the child's face.

What I claim as my invention is—

1. In combination, the supporting-rod, the convex-faced nut, concave washer, and retaining-nut, with an adjustable arm provided with a concavo-convex slotted head, substantially as and for the purpose set forth.

2. The combination of the supporting-rod A, convex-faced nut B, concave washer D, retaining-nut E, and adjusting-arm C, provided with the slotted head a, the parts being constructed, arranged, and operating substantially in the manner and for the purposes set forth.

PETER GENDRON.

Witnesses:
H. S. SPRAGUE,
P. M. HULBERT.